May 25, 1954 — P. A. SHAW — 2,679,457
PASTEURIZING DRIED UNCURED FISH MEAL
Filed July 10, 1951

INVENTOR.
PAUL A. SHAW
BY James B. Christie
ATTORNEY

Patented May 25, 1954

2,679,457

UNITED STATES PATENT OFFICE 2,679,457

PASTEURIZING DRIED UNCURED FISH MEAL

Paul A. Shaw, Anaheim, Calif.

Application July 10, 1951, Serial No. 236,035

5 Claims. (Cl. 99—7)

This invention relates to the treatment of dried uncured fish meal and provides a novel process for pasteurizing the meal (to inhibit mold formation) and for reducing its tendency to discolor or scorch during storage. In the case of fish meal which has been subjected to drying at low temperature, the practice of the invention provides a further advantage, in that it inhibits the caking and hardening of the cured meal during subsequent storage.

This application is a continuation-in-part of my co-pending application Serial No. 54,616, filed October 15, 1948 (now United States Patent No. 2,607,537, granted August 19, 1952).

When fish meal, which has been dried relatively rapidly, either at high or low temperature, is stored in sacks or in bulk, for example in a bin, it tends to deteriorate in quality. Scorching and spontaneous combustion may occur, the zone of maximum action being near the center of the mass where heat dissipation is reduced by the insulation afforded by the surrounding meal but which receives air by percolation through the surrounding mass. The spontaneous oxidation and its attendant ill effects and hazards may be reduced or eliminated by storage in non-porous bags or otherwise preventing the entrance of air. However, this brings other factors into play. Due to cooling and condensation of moisture in the outer portions of the mass from which air is excluded, a moisture content develops which is favorable to mold growth. The growth of the mold is particularly serious when the meal has been dried at temperatures so low that mold spores are not killed. Mold formation in meal that has been subjected to low temperature drying is accompanied in many instances by caking and hardening which further reduces the quality of the product after storage.

The foregoing difficulties may be reduced if the freshly dried fish meal is spread as a very thin bed on a floor and cured at atmospheric temperature and humidity for a period of at least twenty-four hours prior to bulk storage or packaging. This however is an inconvenient expedient because it requires large areas of curing space.

As a result of my investigations I have developed an accelerated curing method which eliminates scorching and fire hazard, as well as mold formation and caking and hardening. The process is rapid, and requires only simple and rugged equipment occupying but little space. The cured product may be stored in porous or non-porous containers or in fairly large bulk exposed to air without fire hazard or product deterioration. It is applicable to fish meal that has been dried at high or low temperature, but is particularly advantageous in the curing of the latter, which as disclosed in the aforementioned co-pending application, has a higher nutritional value as chicken feed, etc.

In accordance with my invention, uncured fish meal which has been dried relatively rapidly (and particularly fish meal which has been dried rapidly at temperatures at which mold spores continue to live, say below 140° F.) is cured prior to storage in bulk, either in packages or otherwise, by forcing air through a mass of the uncured meal for a comparatively short period of time, say about 15 to 90 minutes. The air passing through the meal brings about the rapid oxidation of some of the fat or other organic matter contained therein. This reaction is exothermic, and the heat thus produced is employed to pasteurize the meal by raising its temperature to a point at which mold spores are killed. At the same time, the meal acquires a relatively uniform moisture content and becomes nonhygroscopic, the result being a stable product which may be stored for long periods without fire hazard or deterioration through discoloration, mold formation, caking or loss in nutritional value.

Optimum results are obtained if the temperature or volume or both of the air employed is regulated so that the meal, during treatment, attains a temperature in the range of about 140–165° F. At lower temperatures destruction of mold spores and consequent pasteurization is not completed. At higher temperatures, say 170–180° F., discoloration and a decrease in nutritional value tend to occur.

In order to conserve the exothermic heat, the operation preferably is conducted in equipment having heat-insulated walls. A variety of types of equipment is suitable, the requisite being that the air have ready and substantially complete access to the mass undergoing treatment. The process may be operated continuously or on batches, although the former is preferred.

One of the most satisfactory types of equipment in which to carry out the process is a bin that is three or four times as high as it is wide and which will accommodate a bed ranging in depth from three to ten feet. The bed is kept at approximately constant depth, and fresh uncured meal is discharged continuously onto the top of the bed while cured meal is continuously withdrawn at the bottom. A bin having a hopper bottom terminating in a power driven star valve is suitable. Air is blown into the bin through a porous bottom or through a bustle pipe surrounding the bin at a low level, say just above the hopper bottom. The walls of the bin may be lagged with any suitable heat insulating material to conserve the exothermic heat of reaction generated within the bin, and thus reduce the amount of heat to be introduced from exterior sources. The amount of heat required will depend upon the freshness of the meal and its fat content. In some cases air at atmospheric temperature is satisfactory. In other cases, a small amount of pre-heat is required.

The process may also be carried out in a screw feeder operating in a closed housing and extending more or less horizontally. The feeder is power driven and has a porous bottom through which the air is forced. It is fed continuously through an upwardly extending pipe at one end and the cured meal is continuously discharged at the other.

These and other aspects of the invention will be understood more thoroughly in the light of the following detailed description taken in conjunction with the accompanying drawing in which.

Figure 1:
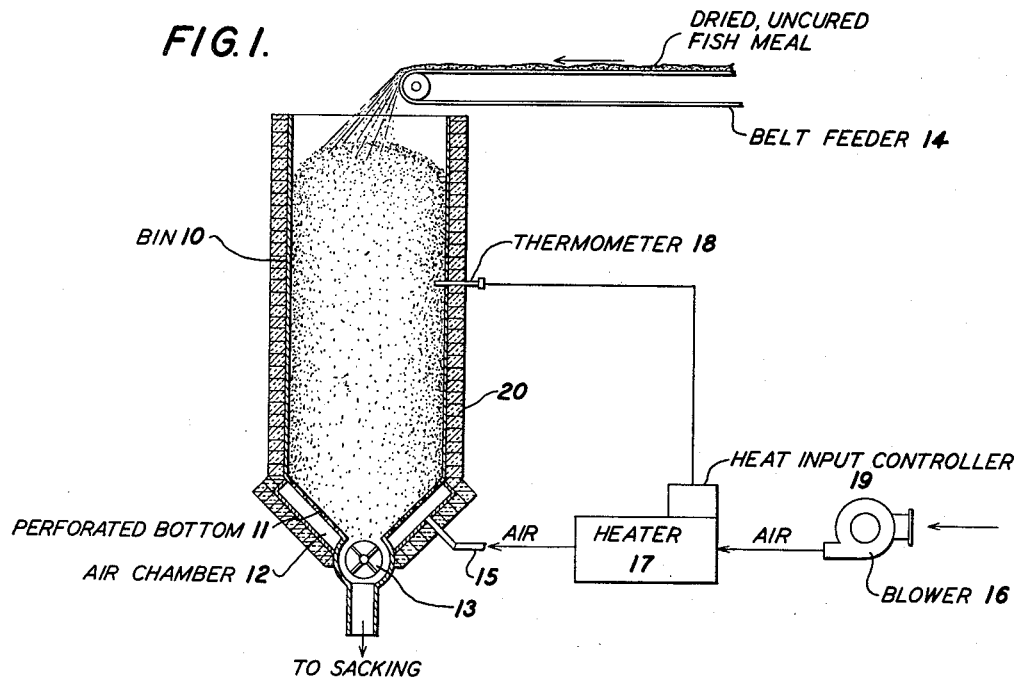
Fig. 1 is a schematic section of one form of apparatus suitable for practicing the invention.

The apparatus of Fig. 1 comprises an upright bin 10, having a perforated hopper bottom 11 underlain by an air chamber 12. The hopper bottom terminates in a power-driven star valve 13 that is rotated continuously when the apparatus is in use and controls positively the rate of discharge as well as sealing the outlet against leakage of substantial quantities of the air employed in the treatment. Fish meal to be cured is discharged continuously into the open top of the bin by a power-driven belt conveyor 14. Air for curing is forced into the chamber through a pipe 15. Atmospheric air is delivered by a blower 16 into a heater 17 of any suitable type, say one provided with steam coils (not shown). A thermometer 18 projects through the side of the bin about half way up its vertical wall. It is connected to a conventional heat input controller 19 which controls the amount of heat introduced into the system from outside sources. The bin is lagged on the outside with a heat insulating layer 20 of light weight brick.

Figure 2:
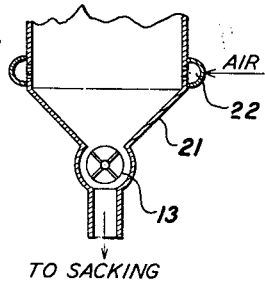
Fig. 2 is a fragmentary section illustrating a modification of the apparatus of Fig. 1.

As shown in Fig. 2, the apparatus of Fig. 1 may be modified by employing a non-porous hopper bottom 21, air being admitted to the mass of meal undergoing treatment through a bustle pipe 22 that encircles the bin at the base of its upright wall, which is perforated to admit the air.

In the operation of the apparatus of Figs. 1 or 2, fresh uncured fish meal which has been dried by any conventional rapid drying procedure is fed continuously into the bin, which is kept substantially full at all times. The rate of flow of meal through the bin is controlled by the speed of rotation of star valve, which discharges the treated meal directly to a sacking operation. Air is forced upward through the mass of the meal in the bin, the temperature control being set so that the temperature of the meal passing the thermometer is in the range of 140°–165° F. The temperature may be attained in some instances without the addition of outside heat, but when the exothermic heat generated in the bin is insufficient, additional heat is automatically supplied in proper amount. The rate of flow through the bin is such that the meal undergoes treatment with air for a time not less than 15 minutes and not exceeding about an hour.

Figure 3:
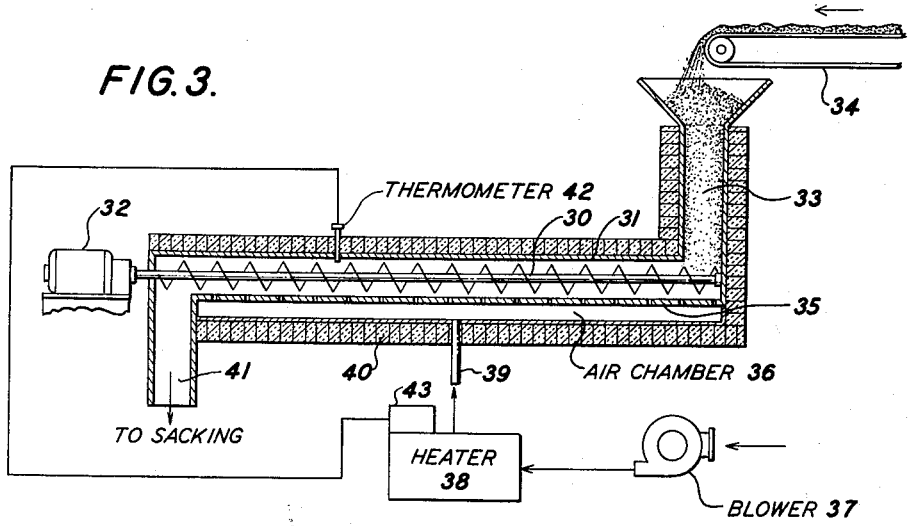
Fig. 3 is a schematic section of an alternate form of apparatus suitable for curing fish meal by my process.

The apparatus of Fig. 3 accomplishes the same results as those of Figs. 1 and 2. It comprises a horizontal screw conveyor 30 running in a closed housing 31 and driven by a motor 32. The screw receives meal to be treated through an upright feed column 33 at its right end which is choke-fed by a belt conveyor 34 from above. The housing has a perforated bottom 35 underlain by an air chamber 36. Air for the process is supplied by a blower 37 through a heater 38 and a pipe 39 which opens into the air chamber. The screw housing and the feed column are lagged with heat-insulating brick 40. The screw discharges treated meal to a sacking operation through a vertical outlet pipe 41. The temperature of the meal undergoing treatment is continuously observed by a thermometer 42 which controls heat input from the heater by a conventional heat input controller 43 to which the thermometer is connected.

The operation of the apparatus of Fig. 3 is similar to that of Fig. 1 except that the meal is conveyed through the apparatus by the screw instead of by gravity, flow rate being controlled by the speed of rotation of the screw. The same temperature conditions and treatment times are maintained in both types of apparatus.

The proportions of air to be employed in the treatment operation will vary depending upon the freshness, moisture content and fat content of the meal, but in general, will be about 5 to 20 cubic feet of free air per pound of final product.

I claim:

1. A process for pasteurizing dried uncured fish meal and reducing its tendency to scorch and deteriorate through spontaneous combustion which comprises forcing air through a mass of the fish meal while maintaining its temperature in a range of about 140° F. to about 165° F. such that contained mold spores are killed but no substantial discoloration due to scorching occurs, the air being forced through the mass for a period of about 15 to about 90 minutes.

2. A process for pasteurizing dried uncured fish meal and reducing its tendency to scorch and deteriorate through spontaneous combustion which comprises forcing air through a mass of the fish meal while maintaining its temperature in the range of about 140°–165° F., the air being forced through the mass for a period of at least 15 minutes.

3. Process according to claim 2 in which the meal is continuously fed into one portion of the mass undergoing treatment and continuously withdrawn from another and remote portion of the mass after the air has been forced through it.

4. In treating fish meal, the improvement which comprises drying the meal relatively rapidly at temperatures below about 140° F. so that at least some contained mold spores are not killed and thereafter forcing air through a mass of the resulting uncured meal for at least 15 minutes while maintaining the meal at a temperature above about 140° F. and below about 165° F. so that the mold spores are killed.

5. A process for pasteurizing dried uncured fish meal and for reducing its tendency to scorch and deteriorate through spontaneous combustion during storage, which comprises forcing an oxidizing gas through the mass of the meal to generate exothermic heat, employing the exothermic heat thus generated to pasteurize the fish meal and controlling the volume of the oxidizing gas employed so that the meal is heated by the exothermic heat to a temperature in the range of about 140° F. to about 165° F. so that contained mold spores are killed but substantial discoloration due to scorching does not occur, the oxidizing gas being forced through the mass of meal for at least 15 minutes.

References Cited in the file of this patent

UNITED STATES PATENTS

| Number | Name | Date |
|---|---|---|
| 2,013,476 | Peebles | Sept. 3, 1935 |
| 2,167,723 | Meakin | Aug. 1, 1939 |